United States Patent
Itoh

(10) Patent No.: US 7,482,719 B2
(45) Date of Patent: Jan. 27, 2009

(54) VEHICLE AC GENERATOR HAVING COOLING FINS OF VOLTAGE REGULATOR PROTRUDING TO POSITIONS EXTERNAL TO A HOUSING WHICH COVERS A MAIN BODY OF THE VOLTAGE REGULATOR

(75) Inventor: Motoki Itoh, Oobu (JP)

(73) Assignee: Denso Corporation, Kariya (JP)

( * ) Notice: Subject to any disclaimer, the term of this patent is extended or adjusted under 35 U.S.C. 154(b) by 308 days.

(21) Appl. No.: 11/357,948

(22) Filed: Feb. 22, 2006

(65) Prior Publication Data

US 2006/0214523 A1  Sep. 28, 2006

(30) Foreign Application Priority Data

Mar. 22, 2005 (JP) .............................. 2005-080803

(51) Int. Cl.
  H02K 9/22    (2006.01)
  H02K 9/06    (2006.01)
  H02K 11/04   (2006.01)
  H02K 19/36   (2006.01)
(52) U.S. Cl. .......................... 310/64; 310/62; 310/68 D
(58) Field of Classification Search .................. 310/54, 310/58, 64, 67 R, 68 D, 91, 52, 59, 62–63, 310/68 R
  See application file for complete search history.

(56) References Cited

U.S. PATENT DOCUMENTS

| | | | | |
|---|---|---|---|---|
| 1,700,840 A | * | 2/1929 | Gay | ............................. 310/52 |
| 3,602,747 A | * | 8/1971 | Stroppa et al. | ............ 310/68 D |
| 4,419,597 A | * | 12/1983 | Shiga et al. | ............... 310/68 D |
| 4,794,285 A | * | 12/1988 | Nimura et al. | ............ 310/68 D |
| 5,021,696 A | * | 6/1991 | Nelson | ........................ 310/62 |
| 6,169,344 B1 | * | 1/2001 | Tsuruhara | ..................... 310/58 |
| 6,291,913 B1 | | 9/2001 | Nikawa et al. | |
| 6,740,995 B2 | * | 5/2004 | Oohashi et al. | ............ 310/68 D |
| 6,911,750 B2 | * | 6/2005 | Bradfield et al. | ........... 310/68 D |
| 7,067,947 B2 | * | 6/2006 | Ihata et al. | ..................... 310/62 |
| 7,420,302 B2 | * | 9/2008 | Archer et al. | .................. 310/90 |
| 2004/0183385 A1 | * | 9/2004 | Takahashi et al. | .......... 310/68 D |
| 2004/0256928 A1 | | 12/2004 | Kondo et al. | |

FOREIGN PATENT DOCUMENTS

| | | |
|---|---|---|
| JP | A-2001-16829 | 1/2001 |
| JP | A-2004-282905 | 10/2004 |
| JP | A-2005-012886 | 1/2005 |

OTHER PUBLICATIONS

Japanese Office Action in Patent Application No. 2005-080803, Oct. 28, 2008.

* cited by examiner

Primary Examiner—Burton Mullins
(74) Attorney, Agent, or Firm—Oliff & Berridge, PLC

(57) ABSTRACT

In a vehicle AC generator having a housing that covers a voltage regulator equipped with external cooling fins, and a cooling fan which rotates with the generator rotor to draw external air through the interior of the housing, an aperture is formed in the housing at a position corresponding to the voltage regulator, and outer end portions of the cooling fins protrude through the aperture to positions beyond the outer circumference of the housing, to dissipate heat from the vehicle-mounted regulator during low-speed operation of the generator, when the rate of air flow through the aperture is low.

2 Claims, 2 Drawing Sheets

VEHICLE AC GENERATOR HAVING COOLING FINS OF VOLTAGE REGULATOR PROTRUDING TO POSITIONS EXTERNAL TO A HOUSING WHICH COVERS A MAIN BODY OF THE VOLTAGE REGULATOR

CROSS-REFERENCE TO RELATED APPLICATIONS

This application is based on and incorporates herein by reference Japanese Patent Application No. 2005-080803 filed on Mar. 22, 2005.

BACKGROUND OF THE INVENTION

1. Field of Application

The present invention relates to an AC generator for installation in a motor vehicle such as a passenger automobile, truck, etc.

2. Description of Related Art

In general, a voltage regulator apparatus (referred to in the following simply as a voltage regulator) that controls the output from an AC generator of a vehicle, and a rectifier apparatus, are each covered and thereby protected by a housing that is constituted by a rear cover, or rear frame, etc., of the AC generator. Such a voltage regulator includes a cooling fin unit that is attached to the main body of the voltage regulator and is also covered by the housing, where the term "cooling fin unit" is used herein to signify a body that is formed with a plurality of cooling fins. An example of such an AC generator is described in Japanese patent publication No. 2005-12886 (pages 3-6, FIGS. 1-8). With such a type of AC generator, external air which is drawn into the interior of the housing by a fan mounted on the rotor of the AC generator flows between the cooling fins as the AC generator (driven from the vehicle engine) rotates, thereby cooling the fins.

However with such a type of AC generator, when the vehicle engine is running at a low speed, the amount of external air that is driven to flow through the housing that covers the voltage regulator etc., becomes reduced, so that the problem arises that the temperature of the voltage regulator increases during such low-speed operation. In particular, the temperature of the rectifier apparatus will increase due to the reduced level of cooling air flow, and this contributes to increasing the temperature of the voltage regulator. That is to say, the temperature of the voltage regulator may become excessively high due to radiant heat from the rectifier apparatus, i.e., heat produced other than by the voltage regulator itself.

Moreover in recent years, a need has arisen for providing an increased level of output power from a vehicle AC generator when the vehicle engine is running at low speed. Such an increase in output power level tends to increase the temperature within the housing, by increasing the level of radiant heat that affects the voltage regulator, and so increasing the temperature of the voltage regulator during low speed operation.

In order to increase the efficiency of cooling the voltage regulator during such low-speed engine operation and also at other levels of engine speed, it has been proposed in the above-mentioned Japanese patent disclosure to form one or more apertures in the housing, adjacent to the cooling fins, through which external air passes into interior of the AC generator. Part of this cooling air flows between the cooling fins, thereby providing increased efficiency of cooling. Such a configuration is shown for example in FIGS. 4 and 5 of the above-mentioned Japanese patent disclosure, in which the fins 840 of a cooling fin unit 808 are located behind two apertures that are formed in a housing 9, which covers the main body of a voltage regulator 8.

However when this is done in a vehicle that may be subjected to frequent occurrences of water (i.e., spray from the road surface) entering the engine compartment, the problem arises that water may readily be drawn into the interior of the housing that covers the voltage regulator and rectifier apparatus, through such cooling air intake aperture(s). Increased amounts of moisture entering the housing will encourage corrosion of metal parts within the housing interior, and also may cause short-circuits between electrical components. This is a significant problem.

SUMMARY OF THE INVENTION

It is an objective of the present invention to overcome the above problem, by providing a vehicle AC generator whereby the effectiveness of cooling the voltage regulator during low-speed rotation operation of the AC generator is increased, while in addition the amount of water that can reach the voltage regulator from the engine compartment of the vehicle is reduced.

To achieve the above objectives, the invention provides an AC generator for installation in a vehicle, comprising a rotor, a cooling fan which rotates together with the rotor to draw a flow of cooling air into the interior of the housing, a stator disposed opposite the rotor, a rectifier apparatus for rectifying an AC output voltage produced by the stator, a voltage regulator apparatus for controlling an output voltage of the rectifier apparatus, a voltage regulator apparatus main body which encloses the voltage regulator apparatus, a cooling fin unit attached to the voltage regulator apparatus main body, a housing which covers at least the voltage regulator apparatus main body and the rectifier apparatus, and a cooling fan which rotates together with the rotor to draw a flow of cooling air into the interior of the housing, with the AC generator being characterized in that an aperture is formed in the housing at a location corresponding to the voltage regulator apparatus main body, with a part of the cooling fin unit protruding through the aperture to a position beyond the external circumference of the housing.

In that way, even if the rate of flow of cooling air into the aperture in the housing becomes reduced due to the speed of rotation of the AC generator being low, natural radiant cooling is effected by the cooling fin unit that protrudes from the housing, while in addition the cooling fin-unit is cooled by air flow within the engine compartment, in particular by a forced flow of air from the radiator fan of the vehicle engine. Hence, an enhanced level of cooling efficiency can be achieved for the voltage regulator, when the AC generator is operating at a low speed of rotation. Moreover the aperture in the housing through which the cooling fin unit protrudes can be configured such that the effective size of the aperture is substantially reduced, due to the presence of the outwardly protruding fins of the cooling fin unit.

As a result, water can be effectively prevented from entering the housing through that aperture, from the interior of the engine compartment, while at the same time an improved degree of efficiency of cooling by the cooling fin unit can be achieved.

The cooling fin unit preferably comprises a base portion having one side that abuts on the voltage regulator apparatus main body and having the opposite side formed with a plurality of outwardly extending cooling fins, with respective outer end portions of at least a part of the plurality of cooling fins extending through the aperture to positions outside the external circumference of the housing.

In that way, when the vehicle engine is operating at a low speed of rotation, so that the fan of the AC generator is drawing air into the interior of the housing at only a low rate of flow, effective heat dissipation is effected by the parts of the cooling fins that protrude outside the housing, thereby preventing the voltage control apparatus from reaching an excessively high temperature. On the other hand when the vehicle engine is running at high speed, air is drawn into the aperture at a high rate of flow (i.e., through the cooling fins of the cooling fin unit, and through gaps between the aperture circumference and the cooling fins), thereby achieving effective cooling of the voltage control apparatus.

The invention would be typically applied to an AC generator having a mutually attached front frame and rear frame, for supporting the rotor and the stator, with the above-mentioned housing being constituted by a rear cover which is fixedly attached to the rear frame.

Alternatively, the rear cover may be omitted, with the rear frame itself constituting the housing which covers the voltage regulator apparatus and rectifier apparatus.

The aperture in the housing may be oriented at right angles to the axis of the rotor (and hence oriented vertically with respect to the ground surface when the AC generator is installed in a vehicle), e.g., with the fins of the cooling fin unit extending horizontally, or may be oriented at parallel to the axis of the rotor (and hence oriented parallel to the ground surface when the AC generator is installed in a vehicle), e.g., with the fins of the cooling fin unit extending vertically. However other orientations would be possible. Irrespective of the orientation, the aperture in the housing is preferably located at a position that is higher than the rotor, with respect to the ground surface.

In particular when such an air inlet aperture is oriented at right angles to the rotor axis, in the case of AC generators described in the related art such as the aforementioned Japanese patent publication No. 2005-12886, water can readily enter the aperture from the engine compartment. However with the present invention, as a result of disposing the cooling fins to project outward through the aperture, direct entry of water (e.g., as spray) from the engine compartment into the interior of the housing can be substantially prevented, since as described above, the effective size of the aperture is substantially reduced due to the presence of the outwardly protruding cooling fins.

In addition, water which reaches the exterior surface of the housing and then runs down that exterior surface is substantially prevented from entering the housing through the aperture, due to the presence of the cooling fins.

DESCRIPTION OF PREFERRED
EMBODIMENTS

Figure 1:
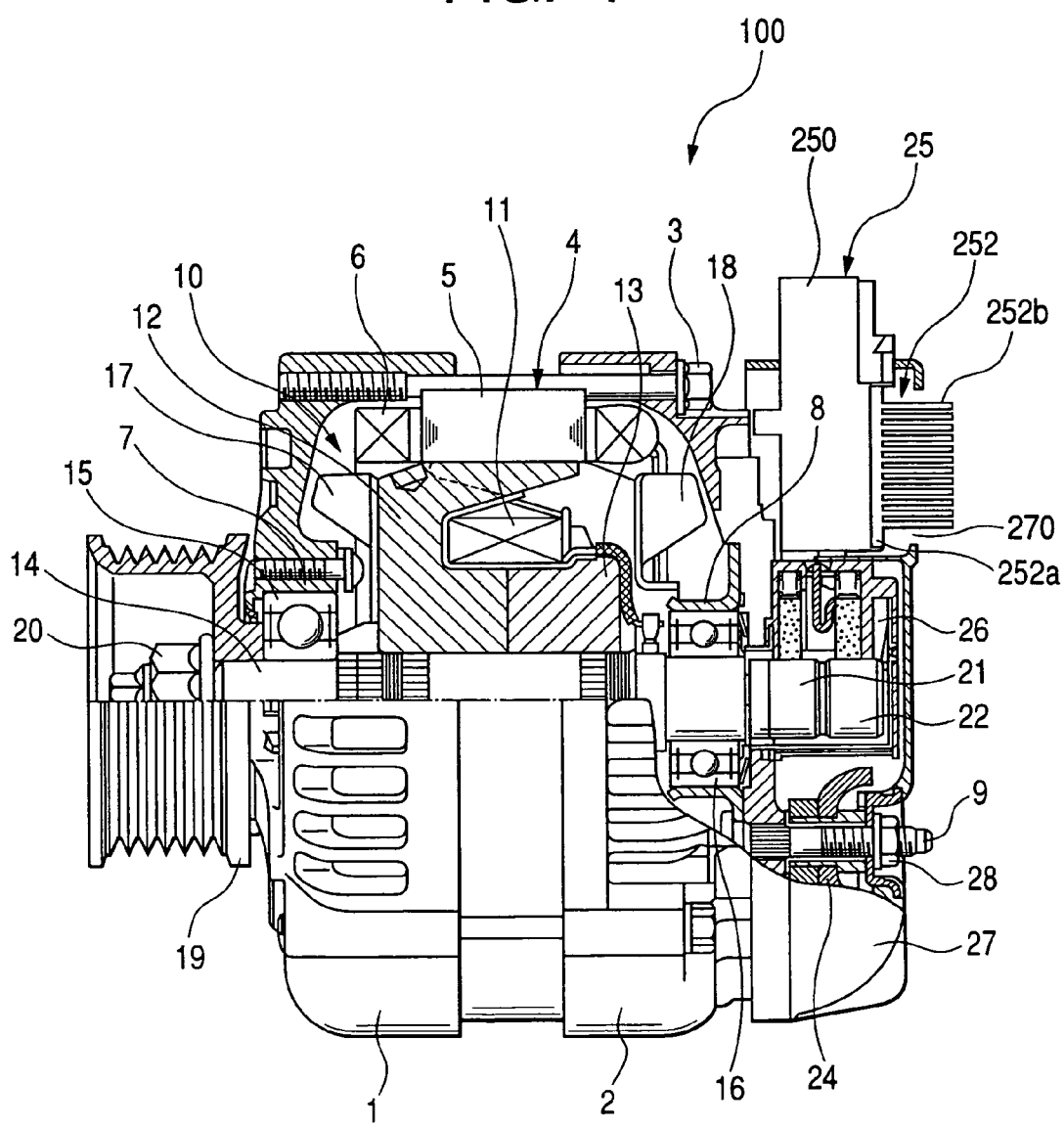
FIG. 1 shows the general configuration of an embodiment of a vehicle AC generator.

FIG. 1 shows the overall configuration of a embodiment of an AC generator for use in a motor vehicle (referred to in the following simply as a vehicle AC generator). In FIG. 1, a vehicle AC generator 100 is made up of components including a front frame 1, a rear frame 2, a stator 4, a rotor 10, a voltage regulator 25, a brush apparatus 26, and a rear cover 27. The front frame 1 and rear frame 2 are each of bowl-shaped configuration, mutually attached as shown by a plurality of bolts 3. The stator 4 is fixedly attached within the interior of the front frame 1. A bearing box 7 is formed integrally in the front frame 1, and a bearing box 8 made of steel is attached to the rear frame 2 by an articulated bolt 9.

The stator 4 is basically made up of a stator iron core 5 and a stator winding 6. The rotor 10 is made up of a field winding 11, pole cores 12 and 13, a rotor shaft 14, etc., and is rotatably supported by a pair of bearings 15 and 16 which are retained in bearing boxes 7 and 8. The end faces of the pole cores 12, 13 with respect to the axial direction have centrifugal cooling fans 17, 18 respectively attached thereto. To draw in air from the exterior and direct a flow of cooling air to the field winding 11, the front-end cooling fan 17 has blades that slope along the direction of rotation of the rotor shaft (i.e., as viewed along the axial direction, the radially outer end of each blade is advanced with respect to the radially inward end, along the direction of rotation).

As can be understood from FIG. 1, the rear frame 2 is configured in relation to the rear cooling fan 18 such that external air is drawn into the interior of the rear cover 27 by the rear cooling fan 18 (with a part of the air flow passing in through an aperture 270 in the rear cover 27, described hereinafter).

The front end of the rotor shaft 14 has a pulley 19 fixedly attached thereto by a nut 20, for driving the rotor shaft 14 by an engine of the vehicle (not shown in the drawings). The rear end of the rotor shaft 14 is positioned outside the rear frame 2, and has a pair of slip rings 21, 22 mounted thereon which are electrically connected to the field winding 11.

Electrical components including the rectifier apparatus 24, the voltage regulator 25 and the brush apparatus 26 etc., are fixedly attached on the exterior of the axial end face of the rear frame 2, by the articulated bolt 9, etc. The rectifier apparatus 24 rectifies a 3-phase AC voltage that is produced by the stator winding 6, to obtain a DC output voltage. The voltage regulator 25 controls the output voltage of the vehicle AC generator 100 by regulating the excitation current that flows in the field winding 11 of the rotor 10, with the excitation current (produced by the rectifier apparatus 24) being supplied through the slip rings 21, 22 of the rotor 10.

The rear cover 27 of this embodiment is a protective cover formed of a plastic material such as nylon, which serves to cover the voltage regulator 25 and the rectifier apparatus 24, brush apparatus 26 (where the term "cover the voltage regulator" as used in this description and the appended claims is to be understood as signifying "covers a substantial part of the voltage regulator"). The main function of the rear cover 27 is to shield the rectifier apparatus 24.

In the appended claims, the general term "housing" will be applied as a general term for a component that performs the function of the rear cover 27. In the case of a vehicle AC generator which does not utilize a separate member such as the rear cover 27, but in which the voltage regulator 25 and rectifier apparatus 24, etc., are enclosed within the rear frame, then the rear frame itself would constitutes the "housing", with the significance applied herein.

The rear cover 27 is fixedly attached to the rear frame 2 by the bolt 9 and a nut 28, tightly retaining the rectifier apparatus 24 between the rear frame 2 and the rear cover 27.

The relationship between the voltage regulator 25 and the rear cover 27 will now be described. As shown in FIG. 1, the voltage regulator 25 of this embodiment is made up of a voltage regulator main body 250 and a cooling fin unit 252, with the cooling fin unit 252 serving to dissipate heat that is generated by the voltage regulator main body 250. The cooling fin unit 252 is made up of a base portion 252a which is attached to and abuts against the voltage regulator main body 250 on one side, and has a plurality of cooling fins 252*b* protruding from its opposite side. With this embodiment, each cooling fin is in the form of a flat rib, e.g., of rectangular shape, which extends parallel to a plane that is defined by the axial direction of the rotor shaft 14 and a tangent to the circumference of the rotor shaft 14. The cooling fins 252*b* are disposed at regular spacings from one another.

An aperture 270 is formed in the rear cover 27, at a position corresponding to the voltage regulator 25. The shape and size of the aperture 270 are determined such that at least the outer ends of the cooling fins 252*b* protrude to positions that are beyond the outer circumference of the rear cover 27. The extent to which the cooling fins 252b protrude outside the aperture 270 can be determined by forming the cooling fins 252*b* to extend to an appropriate height above the base portion 252*a*.

During normal rotation speed operation of the vehicle AC generator 100, part of the flow of cooling air that is drawn in by the rear cooling fan 18 passes into the interior of the rear cover 27, through the part of the aperture 270 that is not occupied by the cooling fins 252*b*. However during low rotation speed operation of the vehicle AC generator 100, the parts of the cooling fin unit 252 that protrude outside the rear cover 27 will be cooled by a flow of cooling air from the radiator fan of the vehicle engine. Hence, the cooling performance during such low rotation speed operation can be substantially enhanced.

Moreover, due to the presence of the cooling fins 252*b* protruding through the aperture 270, the effective area (i.e., effective size of opening) of the aperture 270 is substantially reduced, thereby reducing the extent to which water (e.g., spray within the engine compartment) can enter the interior of the rear cover 27. However the effective area of the aperture 270 can be predetermined such that, during normal rotation speed or high rotation speed operation of the vehicle AC generator 100, a sufficient rate of flow of cooling air into the rear cover 27 via the aperture 270 can be achieved.

With the vehicle AC generator 100 of this embodiment, having the configuration shown in FIG. 1, the aperture 270 of the rear cover 27 is oriented vertically with respect to the ground surface when the vehicle AC generator 100 is installed in a vehicle. In this condition as described above, the presence of the cooling fin unit 252 serves to prevent water (e.g., in the form of spray) from flying into the interior of the rear cover 27 through the aperture 270. Moreover, if such water should soak the outer surface of the rear cover 27 and then flow down that surface, the cooling fin unit 252 also substantially prevents the water from entering the rear cover 27 through the aperture 270.

As can be understood from the above description, the configuration of the cooling fin unit 252, and its relationship to the aperture 270 that is formed in the rear cover 27, serve to effectively reduce the amounts of water that can enter the interior of the rear cover 27, while at the same time ensuring effective cooling of the voltage regulator 25 when the vehicle AC generator 100 is being operated at a low speed of rotation, i.e., when the rate of flow of cooling air through the aperture 270 is low.

It should be noted that the present invention is not limited to the above embodiment, and that various modifications or alternative configurations could be envisaged. In particular, the embodiment has been described only for the case in which the aperture 270 is oriented at right angles to the axis of the rotor shaft 14, and in which the cooling fins 252*b* are each of flat shape and oriented parallel to the axis of the rotor shaft 14.

However variation of the orientation of the aperture 270 and/or variation of the shape and orientation of the cooling fin unit 252 are equally possible.

Figure 2:
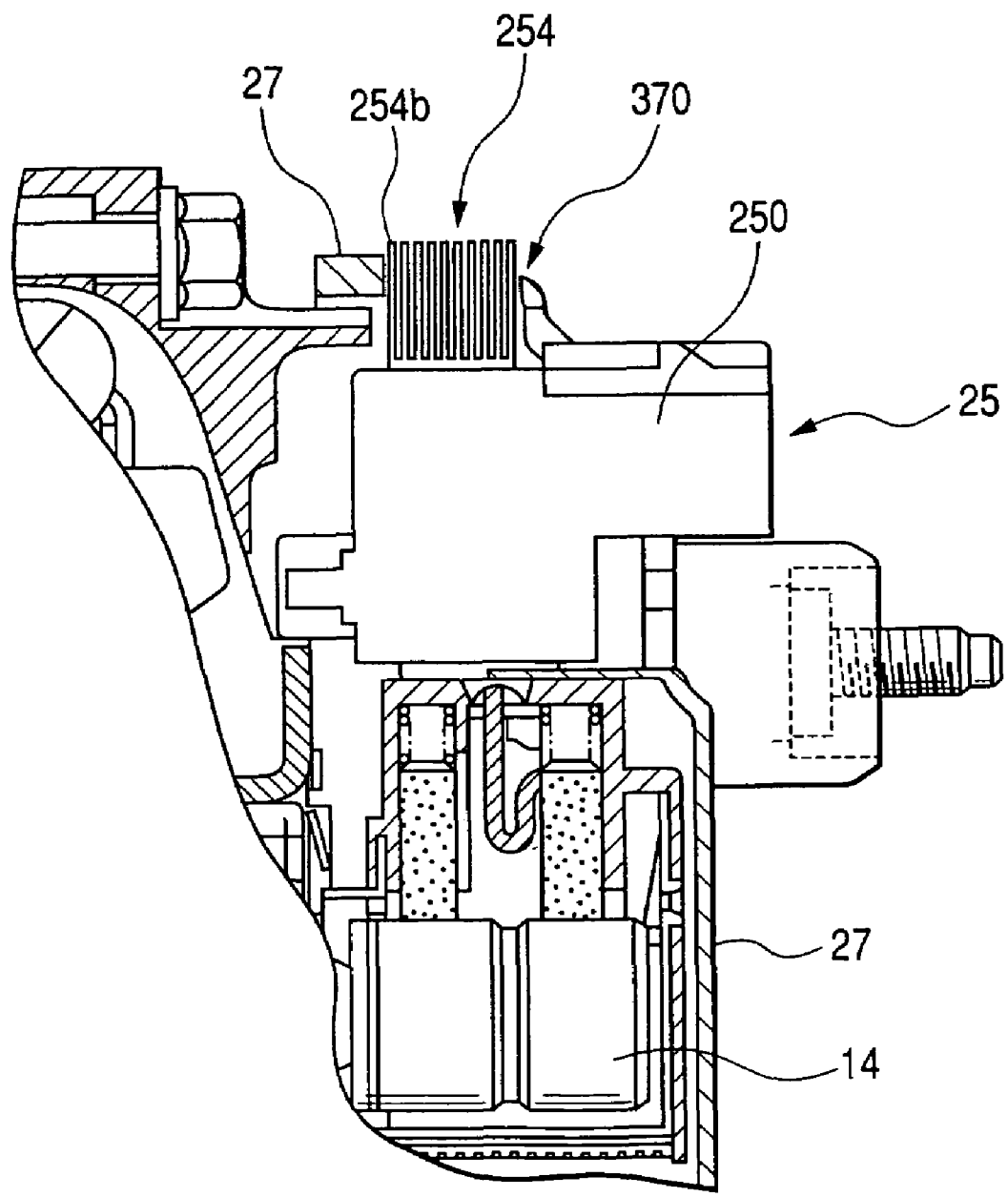
FIG. 2 is a partial cross-sectional view of an alternative embodiment, having respective orientations of an air intake aperture and a cooling fin unit altered from those of FIG. 1.

A second embodiment, which is such an alternative configuration of the first embodiment, is shown in the partial cross-sectional view of FIG. 2. In FIG. 2, components having identical functions to components in FIG. 1 are designated by corresponding reference numerals to those of FIG. 1. With this alternative configuration, the cooling fins 254*b* of a cooling fin unit 254 protrude outward from the rear cover 27 through an aperture 370, which is formed in a topmost part of the rear cover 27, with the aperture 370 being oriented parallel to the axis of the rotor shaft 14 (more specifically, positioned such as to be oriented parallel to the ground surface, when the vehicle AC generator 100 is installed in a vehicle). In this case the cooling fins 254*b* of the cooling fin unit 254, which are each of flat shape and arrayed mutually parallel as for the first embodiment, are oriented at right angles to the axis of the rotor shaft 14 (i.e., each extending vertically with respect to the ground surface when the vehicle AC generator 100 is installed in a vehicle).

It can be understood that this alternative embodiment provides similar advantages to those described for the embodiment of FIG. 1, with the cooling fin unit 254 serving to substantially prevent the entry of water through the intake aperture 370, while also ensuring effective cooling of the voltage regulator 25 when the AC generator is operating at a low speed of rotation.

With the above embodiments, outer end portions of all of the cooling fins 252*b* (or of the cooling fins 254*b*) protrude beyond the outer circumference of the rear cover 27. However it would be equally possible to arrange that only outer end portions of some of the cooling fins 252*b* (or of the cooling fins 254*b*) protrude beyond the outer circumference of the rear cover 27.

Moreover with the above embodiments, a rear cover 27 is provided as a separate component, for covering the rectifier apparatus 24, the voltage regulator 25, etc. However the invention is not limited to such a configuration, and would be equally applicable to a vehicle AC generator in which these electrical components are covered by the rear frame 2. In that case, an aperture would be formed in the rear frame 2, at a position corresponding to the voltage regulator 25, and outer end portions of the cooling fins of a cooling fin unit that abuts against the voltage regulator 25 would extend through that aperture, beyond the outer circumference of the rear frame 2.

Moreover although the above embodiments have been described assuming that the cooling fins are each of flat configuration, e.g., of flat rectangular shape, the invention is not limited to such a configuration. It would for example be possible to envisage other shapes (i.e., arc-shaped, formed with right-angle bends at the outer ends, etc.,) which could provide an even greater degree of protection from entry of water into the interior of the rear cover through the aperture 270 or 370, while also ensuring efficient heat dissipation during low-speed operation of the AC generator.

What is claimed is:

1. An AC generator for installation in a vehicle, comprising a rotor, a stator disposed opposite said rotor, a rectifier apparatus for rectifying an AC output voltage produced by said stator, a voltage regulator apparatus which controls an output voltage of said rectifier apparatus and comprises a combination of a voltage regulator apparatus main body and a cooling fin unit which is attached to said voltage regulator apparatus main body, a housing which communicates with said interior of said AC generator and covers at least said voltage regulator apparatus main body and said rectifier apparatus, and a cooling fan which rotates together with said rotor to draw a flow of external air into an interior of said housing, said housing having an aperture formed therein at a location corresponding to a location of said voltage regulator apparatus;

wherein a part of said cooling fin unit protrudes through said aperture, to a position beyond an external circumference of said housing, and wherein said aperture is oriented substantially parallel to a ground surface when said AC generator is installed in a vehicle.

2. An AC generator as claimed in claim 1, wherein said aperture is positioned in said housing at a location that is higher than said rotor, with respect to said ground surface.

* * * * *